Oct. 3, 1967 R. CHAMBERS 3,344,659
APPARATUS FOR DETERMINING THE COMPOSITION
OF MULTIPHASE FLUIDS
Filed March 19, 1965
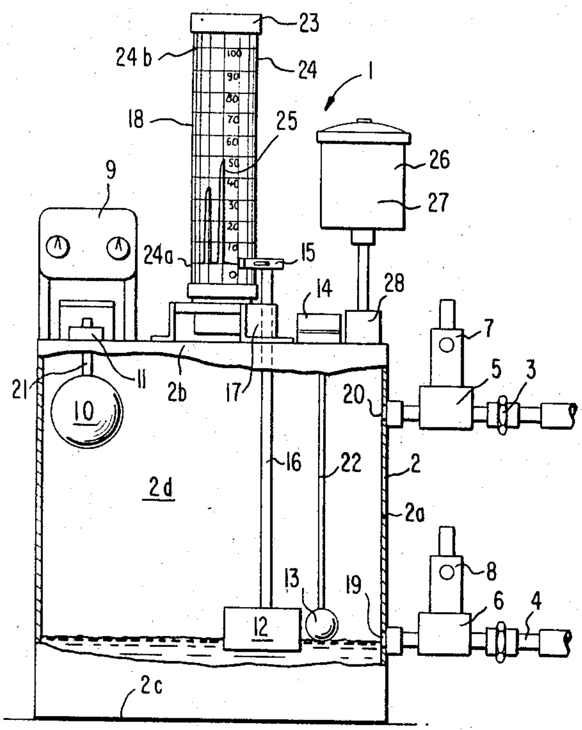
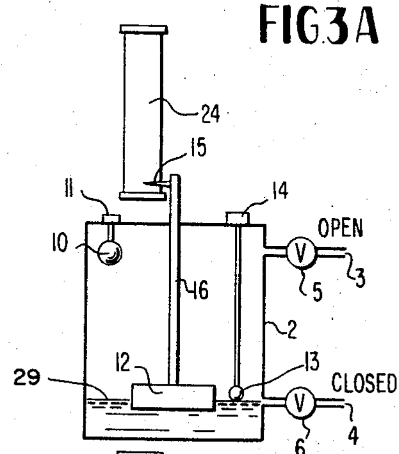
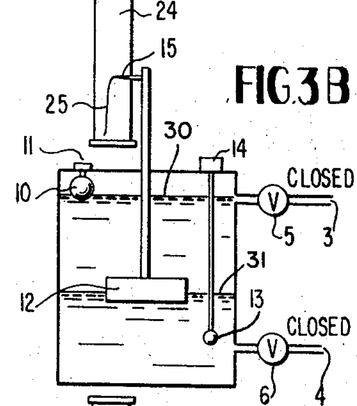
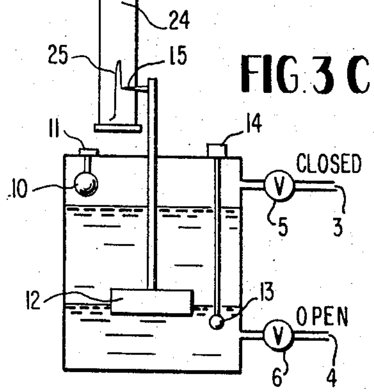
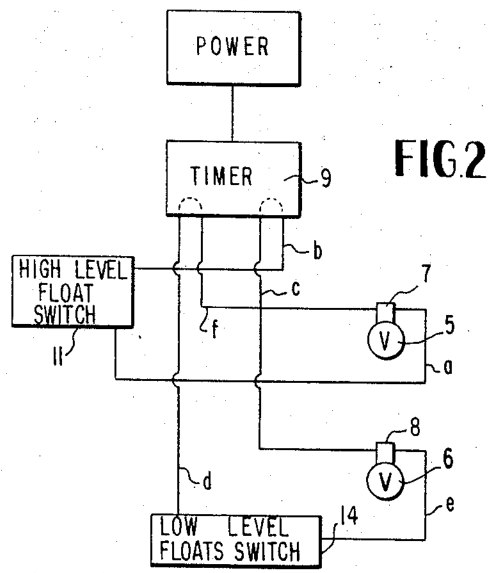
INVENTOR
REX CHAMBERS
BY Burns, Doane, Benedict, Swecker & Mathis
ATTORNEYS 3,344,659

APPARATUS FOR DETERMINING THE COMPOSITION OF MULTIPHASE FLUIDS

Rex Chambers, Albany, Tex., assignor of one-half to H. R. Stasney, Albany, Tex.

Filed Mar. 19, 1965, Ser. No. 441,029
3 Claims. (Cl. 73—61.1)

ABSTRACT OF THE DISCLOSURE

An apparatus including a reservoir, a valved fluid inlet and a valved fluid outlet. A float within the reservoir is designed to be buoyantly supported at the interface between two liquids such as oil and water. An indicator is carried by the float and cooperates with a recorder to provide a record of fluctuations in the height of the interface over a period of time. A control mechanism induces a sequence of valve operations where the inlet is opened and remains open until incoming fluid has reached a particular level within the reservoir. The inlet is then closed and remains closed, along with the outlet, while separation of components of the fluid occurs. The outlet is then opened to discharge the separated components of the sample. The control mechanism repeats this sequence of events on a cyclic basis.

*Background and objects of invention*

This invention relates to apparatus for determining the composition of multiphase fluids. In particular, it relates to an apparatus for providing cyclic measurements of the relative percentages of oil and water in fluid extracted from oil wells.

For several reasons, it is desirable to provide an indication of the relative percentages of oil and water in fluid being extracted from oil wells. While a variety of devices have been heretofore devised for accomplishing such an analysis, they have in general been characterized by structural and operational complexities. In addition, many such previously known devices for accomplishing the analysis have required the entire flow from a well to continuously pass through an analysis system and have adversely affected the normal pressure and velocity characteristics of this flow.

In general, devices previously employed for analyzing the content of well fluids have been of such a size as to require more or less permanent installations. In many instances, this has required a large number of separate analysis devices, each installed in combination with an individual flow line leading from one or more wells.

Recognizing the need for an improved, simplified, and portable, well fluid analysis apparatus and method, it is an object of the present invention to provide apparatus which substantially obviates problems of the type above noted.

It is a particuluar object of the invention to provide such apparatus which is characterized by structural simplicity, operational simplicity and reliability.

It is also an object of the invention to provide apparatus which yields a permanent and easily interpreted analysis record.

It is likewise an object of the invention to provide such apparatus which may be operated at remote locations with a portable power source and without a fulltime attendant or operator.

A still further object of the invention is to provide such apparatus which extracts periodic samples from a source to be analyzed and does not require the passage of all of the fluid from the source through the device.

Yet another object of the invention is to provide such apparatus which may be readily incorporated in any existing well system.

*Summary of invention*

In accomplishing the foregoing objectives, there is provided an apparatus for determining the composition of multiphase fluids. In the operation of this apparatus, samples are cyclically withdrawn from a source of multiphase fluid. Each such sample is collected in a reservoir. The percentage of the total height of each sample, from the base of the sample within the reservoir to an interface between separated fluid phases within the sample, is measured. Each such percentage determination is recorded and these recordings are accummulated on a permanent record. Appropriate means are provided in the apparatus for the sample withdrawals, sample collections, interface measurements, and percentage recordings.

A preferred embodiment of the apparatus includes a reservoir and inflow and outflow conduit means. The inflow conduit means communicate with the interior of the reservoir and is adapted to supply multiphase fluid thereto. The outflow conduit means is connected with the reservoir, communicates with the interior thereof, and is adapted to discharge fluid from this reservoir. First valve means are included in the inflow conduit means while second valve means are included in the outflow conduit means. First operating means are provided for the first valve means while second operating means are provided in the second valve means. Timer means are included in the apparatus for actuating the first operating means to open the first valve means after a predetermined time interval subsequent to a first actuating signal and to thereafter actuate the second operating means to open the second valve means after a predetermined second time interval subsequent to a second actuation signal.

First and second float means are included in the apparatus. The first float means is adapted to be buoyantly supported by the least dense phase of the fluid while the second is adapted to be buoyantly supported by the most dense phase of the fluid.

First signal generating means and second signal generating means are also included in the apparatus. The first signal generating means is adapted to be actuated by the first float means to generate the second actuating signal. The second signal generating means is adapted to be actuated to generate the first actuating signal.

Indicating means in the apparatus is carried by the second float means and adapted to indicate the elevation of the second float means within the reservoir. Recording means in the apparatus is adapted to cooperate with this indicating means to provide a record of elevation indications provided by the indicating means.

In describing the invention, reference will be made to a preferred embodiment illustrated in the application drawings.

In these drawings:

FIGURE 1 is a schematic, partially sectioned, vertical, elevational view of a preferred separation apparatus of this invention;

FIGURE 2 is a schematic, diagrammatic representation of electrical circuitry which may be employed to operate the FIGURE 1 apparatus; and FIGURES 3*a* through 3*c* are schematic, sectioned, vertical elevational views of the FIGURE 1 apparatus illustrating the arrangement of apparatus components during various phases of an analysis cycle, with FIGURE 3*a* indicating the position of apparatus components when a sample is about to be introduced into the apparatus, with FIGURE 3*b* illustrating these components after a sample has been introduced, and with FIGURE 3*c* illustrating the disposition of these components while the sample is being discharged from the apparatus.

*Context of the invention*

The method and apparatus of this invention will often be employed in measuring the oil and water composition of fluid obtained from oil wells.

Conventionally, the apparatus of this invention will be installed in an oil field in the vicinity of a flow line. Fluid flowing through this line may come from a single well or from a series of separate wells.

In the preferred form of the apparatus, its operating elements are electrically actuated. It is contemplated that the electrical power source for actuating these elements may comprise a conventional storage battery. However, under certain circumstances it might be desirable to utilize a convenient power line as a source of electrical energy to operate the apparatus.

As previously noted, the apparatus of this invention is designed to periodically extract fluid samples from a source to be analyzed. In the practice of this invention, it has been found satisfactory to extract a sample of about six gallons of well fluid during each hour of a test period. In many instances twenty-four hours has been found to be a satisfactory test period. It will be appreciated, of course, that the samples analyzed during the test period are extracted from a conduit through which well fluid is flowing.

An area of application where the invention has found particular utility is in oil fields where secondary recovery operations are being conducted through water flooding. In these operations, water is injected into some wells to displace subterranean formation fluids from a producing formation into one or more production wells. In order to evaluate the efficiency of such water flooding operations, it is desirable to monitor the relative percentages of oil and water obtained from the producing wells.

As will be hereinafter described, the well tests of this invention are installed to extract samples without interfering with the flow velocities or pressures in well fluid flow lines. Thus, the sampling and analysis operations involved in this invention are accomplished under normal operating conditions without interfering with the normal pressures and velocities of fluid in the flow lines.

*Apparatus*

FIGURE 1 schematically illustrates a preferred embodiment of the apparatus. This apparatus 1 is portable in character and is designed to be positioned in an oil field in close proximity to a flow line, the flow through which is to be periodically analyzed.

Included in the apparatus shown in FIGURE 1 is a reservoir 2. Reservoir 2 may comprise a generally cylindrical side wall 2a, a top wall 2b, and a base 2c which confine a reservoir interior space 2d.

As will be appreciated, the reservoir 2 may be characterized as being generally cylindrical in character and as before noted may be dimensioned so as to accommodate fluid samples of about six gallons.

An inflow conduit 3 communicates with the interior 2d of the reservoir and extends as a branch line from an oil field flow line not shown. Thus, inflow conduit means 3 is adapted to supply a multiphase oil and water fluid to the interior 2d of the reservoir 2 without imposing velocity or flow resistance to fluid within the flow line.

Discharge or outflow conduit means 4 is connected with the reservoir 2 and communicates with its interior. Conduit means 4 is adapted to discharge fluid samples from the reservoir at the conclusion of each sample analysis.

First valve means 5 is included in the inflow conduit means 3 to control fluid flow therethrough. Second valve means 6 is included in the outflow conduit means 4 to control discharge flow.

First operating means 7, provided for actuating first valve means 5, may comprise a conventional valve actuating solenoid. Similarly, second operating means 8 for actuating the second valve means 6 may also comprise a conventional, valve operating solenoid.

Alternatively, the above described valve means may comprise pumps in lieu of ordinary valves and the operating means may comprise pump driving, electrical motors.

Conventional and schematically shown timer means 9 may be mounted upon the top wall 2b of the reservoir 2. Timer means 9 serves to control the opening of valve means 5 and valve means 6. Timer means 9 may include separate timing circuits for individually controlling the opening of the valve means 5 and 6.

Timer means 9 serves to actuate the first operating means 7 to open the first valve means 5 after a predetermined first time interval subsequent to a first actuating signal to be hereinafter described. Thereafter the timer means 9 serves to actuate the second operating means 8 so as to cause the opening of the second valve means 6 after a predetermined second time interval subsequent to a second actuation signal, also to be subsequently described.

First float means 10 is disposed within the interior 2d of the reservoir 2. First float means 10 is adapted to be buoyantly supported by the least dense phase of the fluid being sampled, i.e. oil.

First signal generating means 11 may also be mounted on the reservoir top 2b. This signal generating means may comprise a conventional electrical switch adapted to be operated by movement of the float means 10 so as to generate the previously noted second actuating signal.

Second float means 12 is disposed within the interior 2d of the reservoir and is laterally displaced from the first float means 10. Second float means 12 is adapted to be buoyantly supported by the most dense phase of the fluid being sampled, i.e. water, but not by the least dense phase, i.e. oil.

Third float means 13 may be included in the apparatus. Third float means 13 is also adapted to be buoyantly supported by the least dense phase of the fluid, i.e. oil. Third float means 13 is disposed with the interior 2d of the reservoir and is laterally displaced from the float means 12 as schematically shown in FIGURE 1.

Second signal generating means 14, which may comprise a conventional electrical switch, may also be mounted upon the top 2b of the reservoir 2. This second signal generating means is adapted to be actuated by movement of the third float means 13 to generate the previously described first actuating signal.

Conventional ink or pencil type marking or indicating means 15 is supported upon a rod 16 extending vertically upwardly from the second float means 12. As schematically shown in FIGURE 1, rod 16 passes slidably through a collar 17 affixed to the top 2b of the reservoir 2, so as to insure stabilized vertical reciprocation of the indicating means 15 as the float 12 moves vertically within the reservoir cavity 2d in response to changes in fluid elevation therewithin.

As will be appreciated, indicating means 15 is adapted to indicate the elevation of the second float means 12 within the reservoir.

Recording means 18 is adapted to cooperate with the indicating means 15 to provide a permanent record of elevation indications yielded by the indicating means 15.

With the principal components of the apparatus having been described, structural details and interrelations between these components may now be considered.

As shown in FIGURE 1 the outflow conduit means 4 intersects a portion of side wall 2a at junction 19. This junction may be spaced above but is near the base 2c of the reservoir.

The inlet conduit means 3 intersects side wall 2a of junction 20 but is mounted on the upper portion of the reservoir.

The first float means 10 is supported by a rod or chain 21 which comprises a conventional switch actuating device extending downwardly from the switch 11. Thus, as schematically shown in FIGURE 1, the float means 10 is supported beneath the electrical switch 11. Float means 10, linkage 21, and switch 11 are disposed such that the switch 11 is actuated to generate the previously noted second actuating signal when the level of fluid at the top of a sample is at a predetermined high elevation defining a sample upper limit and lifts the float 10.

Third float means 13 is supported by a rod or chain 22 which extends downwardly from the switch 14. As schematically shown in FIGURE 1 the float means 13 is supported beneath the switch 14. Float 13, linkage 22 and switch 14 are disposed such that when the level of fluid within the reservoir drops to a predetermined low level defining a sample lower limit, the float means 13 lowers and the switch 14 is actuated to generate the aforesaid second actuating signal.

Recording means 18 comprises a conventional cylindrical chart recorder including a spindle 23 mounted for rotation about a vertical axis and driven by an electrical motor, not shown.

A removable chart 24 is wrapped around the spindle 23 so as to define a cylindrical recording chart. As schematically illustrated in FIGURE 1, chart 24 is horizontally divided into uniform percentage increments between a lower, zero percentage datum line **24*a* and an upper, one hundred percent datum line 24*b*. The vertical distance between the datum lines 24*a* and 24*b* corresponds to the distance between the upper and lower sample levels within the reservoir space 2*d* as determined by the distance between the actuating positions of the floats 10 and 13**.

The indicating means 15 is mounted on the rod 16 so that with the float 12 supported by fluid at the lower sample level within the reservoir, the marker carried by the indicating means 15 is aligned with the zero datum line **24*a* on the chart 24. Thus, when the float 12 rises, if it should rise to the uppermost sample level as determined by the actuating position of the float 12, the marker 15 will be aligned with one hundred percent datum line 24*b* on the chart 24**.

Bearing in mind that the float 12 is buoyantly supported on water but not oil, it will be appreciated that the float 12 will ride on the oil and water interface of each sample within the reservoir 2. (As will be apparent, a conventional float counterbalancing arrangement may be employed to appropriately calibrate the effective density of the float 12 to cause it to ride at this interface.) Thus, for any given sample, the marker 15 will rise to a point on the chart 24 which is directly indicative of the percentage of water within the sample when the chart is calibrated in percentages reading upwardly as shown in FIGURE 1. In other words, for each sample, the recorder 15 will provide on the chart a marking of the percentage of water contained within the sample. Assuming a complete separation of oil and water within each sample, it will be understood that this indication of water percentage will at the same time provide an indication of oil percentage inasmuch as the oil percentage will be equal to one hundred percent minus the water percentage.

As shown in FIGURE 1, when each sample is introduced into the reservoir 2, the marker 15 will provide a tracing 25 on the chart 24 permanently indicating the percentage of water in the sample. With the chart 24 being rotated in a regular fashion, there will be accumulated on the chart 24 a series of spaced readings 25 indicating the percentage compositions of samples for the test period.

In order to tend to insure complete separation of the oil and water into superposed, separately defined layers within the reservoir, i.e. in order to break any existing emulsion, emulsion breaking means 26 may be included in the apparatus. This emulsion breaking means may comprise a reservoir 27 containing conventional emulsion breaking chemicals and a schematically shown pump 28 for positively injecting these chemicals into the reservoir interior **2*d*. Pump 28** may include an electrical motor operated by the portable power source or an existing power line, with the motor being operated to inject chemicals into samples.

*Mode of operation*

With the structure of a preferred form of the apparatus having been described, the method involved in this invention may now be considered in detail.

In describing this method, reference will be made to the schematic circuit diagram of FIGURE 2 and the schematic component arrangements illustrated in FIGURES 3*a* through 3*c*.

In describing the method, reference will be made to a representative sampling cycle, commencing with the time when a sample is introduced into the reservoir 2.

The initiation of the cycle starts with the actuation of first operating means 7 so as to cause the opening of valve 5. At this point in the commencement of the cycle, the apparatus components are arranged as shown in FIGURE 3*a* with the fluid level 29 within the reservoir **2*d* being at the lowermost sample limit. In this position the indicating means 15 is aligned with the zero datum line 24*a* on the chart 24, the valve 5 is open, and the discharge valve 6** is closed.

With this disposition of apparatus components a sample is withdrawn from the flow line source of well fluid. Fluid continues to flow through the inflow conduit means 3 until the top of the sample of fluid being accumulated within the reservoir reaches the uppermost sample limit 30 and causes the float 10 to move upwardly so as to actuate the first signal generating switch 11. This actuation of the switch 11 causes an electrical impulse to be dispatched along the circuit line *a* so as to cause the operating solenoid 7 to close the valve 5 and to generate what has been previously described as the second actuation signal. The second actuation signal is conveyed along the circuit line *b* to the timer means 9. The timer means 9 then interposes what has been described as a second time interval or dwell period. This second time interval is sufficient to allow fluid within the sample to tend to separate into superposed, more clearly defined oil and water levels. In other words, this second time interval provides a perior during which oil and water emulsion may tend to separate so as to yield more accurate analysis data.

Through the means of conventional circuitry, not shown, the pump 28 may be actuated to dispense emulsion breaking chemicals into the accumulated sample while the sample is within the reservoir. As will be apparent, the amounts of emulsion breaking are so small, that the pump 28 may operate continuously but at a low injection rate. As will also be appreciated, other emulsion breaking devices such as heaters may also be employed.

FIGURE 3*b* illustrates apparatus components at the time that the second actuation signal is generated. As shown in FIGURE 3*b*, when this second signal is generated, the inlet valve 5 will be closed and the fluid level 30 within the reservoir will be at the uppermost sample limit 30. The float 12 will ride in the oil and water interface 31 such that the marker 15 will indicate the percentage of water in the sample and mark this percentage on the chart 24.

As will be apparent, during the aforesaid second time interval, when any existing emulsion is being broken, the amount of free water in the system will be increased so as to cause the float 12 to ride somewhat higher and thus indicate more accurately the percentage of water in the sample.

After the second time interval has elasped, an electrical signal will be conveyed along the circuit line *c* from the timer means 9 to the second operating means 8 so as to cause the opening of the discharge valve 6. This will allow a sample to be discharged from the reservoir 2.

FIGURE 3*c* illustrates apparatus components during the discharging of a sample. As there shown, the valve 5 is closed and the valve 6 is open. The float 12 is lowering on the oil and water interface and the uppermost fluid level has dropped away from the float 10.

When the fluid level within the reservoir drops to the lowermost sample limit 29, insufficient buoyancy is imparted to the float 13 to keep the float 13 in a buoyed condition. As a result, the float 13 exerts a downward force on the linkage 22 so as to cause the actuation of the second signal generating means, i.e. electrical switch 14.

The actuation of switch 14 causes the previously described first actuating signal to be conveyed along the circuit line *d* to the timer means 9 and simultaneously causes an electrical impulse to be conveyed along the circuit line *e* to the valve operating means 8. The impulse conveyed to the operating means 8 causes the valve 6 to close.

The timer means 9 interposes what has been previously described as a first time period or interval. This time interval is the interval between the termination of one sampling operation and the commencement of the next sampling operation. After this first time period has elasped, an impulse is then conveyed along the circuit line *f* to the first operating means 7 to cause the opening of the valve 5 and the commencement of a new sampling cycle.

As will be apparent, the sample procedure will continue on an automatic and continuous cycling basis throughout the period of operation of the apparatus 1 so as to yield a permanent record of cyclically obtained percentages of oil and water composition samples.

*Summary of advantages and scope of invention*

With the structure and mode of operation of a preferred form of the apparatus having been described, principal advantages attendant upon the invention have been made apparent.

A foremost advantage resides in the simplicity of the structure and sampling technique which enables accurate records to be obtained with nominal effort.

An additional advantage involves the automatic and cyclic characteristics of the apparatus which eliminate the need for fulltime or skilled attendants. Other advantages of the apparatus involve its nominal size which enable it to be easily moved from one site to the other so as to be truly portable in character. An additional advantage involves the ease with which the apparatus and method may be employed in existing systems without substantially affecting the flow characteristics of the system and without requiring elaborate installation efforts.

It is also apparent that the permanent record of direct percentage readings obtained through the invention yields a particularly useful and readily interpreted analysis record.

Those familiar with the disclosure of this invention and skilled in the well fluid testing art may well recognize additions, deletions, substitutions and other modifications concerning the described preferred embodiments which would fall within the purview of the invention deemed to be defined in the appended claims.

I claim:

1. An apparatus for determining the composition of multiphase fluids, said apparatus comprising:
   a reservoir;
   inflow conduit means communicating with the interior of said reservoir and adapted to supply multiphase fluid thereto;
   outflow conduit means connected with said reservoir, communicating with the interior thereof, and adapted to discharge fluid from said reservoir;
   first valve means in said inflow conduit means;
   second valve means in said outflow conduit means;
   first operating means for said first valve means;
   second operating means for said second valve means;

timer means for actuating said first operating means to open said first valve means after a predetermined first time interval subsequent to a first actuating signal, and thereafter actuating said second operating means to open said second valve means after a predetermined second time interval subsequent to a second actuation signal;
   first float means adapted to be buoyantly supported by the least dense phase of said fluid;
   first signal generating means adapted to be actuated by said first float means to generate said second actuating signal and to simultaneously actuate said first operating means to close said valve means;
   second float means adapted to be buoyantly supported by the most dense phase of said fluid;
   indicating means carried by said second float means and adapted to indicate the elevation of said second float means with said reservoir;
   recording means adapted to cooperate with said indicating means to provide a record of elevation indications provided by said indicating means;
   third float means adapted to be buoyantly supported by the least dense phase of said fluid and supported within said reservoir at a lower elevation than that of said first float means; and
   second signal generating means adapted to be actuated by said third float means to generate said first actuating signal and to cause the actuation of said second operating means to close said second valve means.

2. An apparatus as described in claim 1:
   wherein said reservoir comprises a portable receptacle; and
   wherein said apparatus further includes means for treating said fluid within said receptacle to tend to separate said fluid into superposed, fluid phase layers.

3. An apparatus as described in claim 2:
   wherein said first operating means comprises electrically responsive, first solenoid means;
   wherein said second operating means comprises electrically responsive means;
   wherein said first signal generating means comprises a first electrical switch mounted on a top portion of said receptacle;
   wherein said first float means is supported beneath said first electrical switch, said first float means being adapted to actuate said first electrical switch when the level of fluid within said receptacle rises to a predetermined high level;
   wherein said second signal generating means comprises a second electrical switch carried by another top portion of said receptacle;
   wherein said third float means is supported beneath said second electrical switch and is adapted to actuate said second electrical switch when the level of fluid within said receptacle drops to a predetermined low level;
   wherein said recording means comprises a cylindrical chart and means for rotating said chart about an axis parallel to the movement axis of said second float means; and
   wherein said indicating means comprises means for marking on said cylindrical chart.

References Cited

UNITED STATES PATENTS

| | | | |
|---|---|---|---|
| 1,971,610 | 8/1934 | Haywood | 73—319 X |
| 3,222,918 | 12/1965 | Kuntz et al. | 73—53 |
| 3,222,928 | 12/1965 | Walker | 73—61.1 X |

DAVID SCHONBERG, *Primary Examiner.*